United States Patent
Banerjee

(10) Patent No.: US 9,644,318 B2
(45) Date of Patent: May 9, 2017

(54) CONSOLIDATION AND DEWATERING OF PARTICULATE MATTER WITH PROTEIN

(71) Applicant: Georgia Tech Research Corporation, Atlanta, GA (US)

(72) Inventor: Sujit Banerjee, Marietta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 176 days.

(21) Appl. No.: 14/400,803

(22) PCT Filed: Jul. 14, 2013

(86) PCT No.: PCT/US2013/050417
§ 371 (c)(1),
(2) Date: Nov. 13, 2014

(87) PCT Pub. No.: WO2014/014790
PCT Pub. Date: Jan. 23, 2014

(65) Prior Publication Data
US 2015/0144573 A1     May 28, 2015

Related U.S. Application Data

(60) Provisional application No. 61/672,497, filed on Jul. 17, 2012.

(51) Int. Cl.
*D21H 17/37* (2006.01)
*C02F 1/56* (2006.01)
(Continued)

(52) U.S. Cl.
CPC ......... *D21H 17/375* (2013.01); *C02F 1/5263* (2013.01); *C02F 1/56* (2013.01); *D21H 17/22* (2013.01); *C02F 1/5272* (2013.01); *C02F 11/122* (2013.01); *C02F 11/127* (2013.01); *C02F 2103/28* (2013.01)

(58) Field of Classification Search
USPC ......................................................... 210/728
See application file for complete search history.

(56) References Cited

U.S. PATENT DOCUMENTS 4,072,606 A    2/1978   Leavitt
6,113,800 A    9/2000   Hopkins et al.
(Continued)

FOREIGN PATENT DOCUMENTS

WO           0137677 A1    5/2001

OTHER PUBLICATIONS

International Preliminary Report on Patentability in related PCT Application No. PCT/US2013/050417, mailed Jan. 20, 2015.
(Continued)

*Primary Examiner* — Chester Barry
(74) *Attorney, Agent, or Firm* — Troutman Sanders LLP; Ryan A. Schneider

(57) ABSTRACT

A method of treating a suspension of particles in a fluid including the steps of promoting flocculation of the particles, and dewatering the flocs to form a cake with a solids content, an improvement including the step of exposing the suspension to chemicals of the protein family. The suspension can include a suspension of biological sludge in water. The suspension can be a suspension of non biological material.

16 Claims, 4 Drawing Sheets

(51) Int. Cl.
*D21H 17/22* (2006.01)
*C02F 1/52* (2006.01)
*C02F 11/12* (2006.01)
*C02F 103/28* (2006.01)

(56) References Cited

U.S. PATENT DOCUMENTS

2004/0147723 A1 7/2004 Mermod et al.
2007/0227971 A1* 10/2007 Denney ................ C02F 1/5236
  210/606

OTHER PUBLICATIONS

International Search Report in priority application No. PCT/US2013/050417 dated May 20, 2014.
Zhang, et al., "Enhanced Dewatering of Waste Sludge with Microbial Flocculent TJ-F1 as a Novel Conditioner," Water Research, vol. 44, Issue 10, pp. 3087-3092 (May 2010).
Milligan, "Lubrication and Soil Conditioning in Tunnelling, Pipe Jacking and Microtunnelling, A State-of-the-Art Review," (Aug. 2000); http://www.eng.ox.ac.uk/Geortech/Research/pipejack/Reports/Soilcond.pdf.

* cited by examiner

CONSOLIDATION AND DEWATERING OF PARTICULATE MATTER WITH PROTEIN

CROSS-REFERENCE TO RELATED APPLICATIONS

This application is a US National Stage of International Application No. PCT/US2013/050417, filed 14 Jul. 2013, which claims the benefit of U.S. Provisional Application No. 61/672,497, filed 17 Jul. 2012, both herein fully incorporated by reference.

STATEMENT REGARDING FEDERALLY SPONSORED RESEARCH OR DEVELOPMENT

N/A

BACKGROUND OF THE INVENTION

1. Field of Invention

The present invention generally relates to the art of dewatering wet particulate matter, and more particularly to a method for increasing the rate of dewatering of sludge and fiber.

2. Background and Related Art

Industrial processes can produce wet solids that require dewatering before disposal or reuse. For example, sludge is produced during the biological treatment of wastewater. It is also produced through a variety of processes such as the manufacture of pulp and paper. The sludge is typically collected and treated with chemicals that promote flocculation of the sludge particles.

It is known to use thickeners such as polymers or lime as a chemical treatment for sludge. Hydrocarbon-based polymers such as cationic polyacrylamide (c-PAM) are commonly used. The flocculated sludge then is dewatered using various known dewatering devices, including, but not limited to, presses of various configurations, and centrifuges. The dewatered sludge is typically in the range of about 15-50% consistency (i.e. 85-50% water content).

The pressed cake of sludge then is disposed of through a variety of means, such as land filling, burning, or land spreading. It is apparent that the water contained in the dewatered sludge is a dead load, and it is therefore advantageous to reduce the water content of the final cake solids as much as possible.

Increasing the cake solids by even a relatively small amount reduces the amount of water associated with the sludge solids that makes disposal inefficient. Therefore, there is a need for a method for increasing the solids content of dewatered sludge.

Dewatering is also critical for processing fibers such as pulp. During papermaking the pulp is thickened through drainage or pressing during various process operations. Any improvement in the solids content of the drained pulp will improve throughput and increase production.

It is thus an intention of the present invention to provide a process, appropriate apparatus and method for dewatering wet particulate matter.

BRIEF SUMMARY OF THE INVENTION

Briefly described, in a preferred form, the present invention consolidates and/or dewaters particular matter with protein.

In an exemplary embodiment, the present invention comprises a method of treating a suspension of particles in a fluid including the steps of (i) promoting flocculation of at least a portion of the suspension of particles with an additive and (ii) dewatering at least a portion of the particles to form a cake with a solids content, the improvement comprising promoting flocculation of at least a portion of the suspension of particles with an additive comprising protein.

The additive can comprise soy protein. The additive can comprise whey protein.

The concentration of the total amount of protein present in the additive can be between approximately 0.01 and 30 lbs/ton of the particles, expressed on a dry solids basis. The concentration of the total amount of protein present in the additive can be between approximately 0.01 and 10,000 mg/liter of the fluid.

The additive can further comprise a flocculant. The flocculant can be a cationic polymer. The flocculant can be a cationic polyacrylamide. The flocculant can be present at a concentration ranging from approximately 1%-90% of the concentration of the total amount of protein present in the additive.

As used herein, and as one of skill in the art will understand, an "agglomerant" is a chemical that binds individual particles into small groups of particles. A "flocculant" is a chemical that then consolidates these groups into flocs. The definitions are not clean, or mutually exclusive, as agglomerants can, on occasion, act as flocculants and vice versa. In general, though, agglomerants are of relatively low molecular weight, and flocculants are of high molecular weight.

Thus, herein, in an attempt to avoid undue confusion, the term "additive" is sometimes used to define that component of the present invention that promotes flocculation of at least a portion of the suspension of particles, and the term "flocculant" used to define that component of the present invention that consolidates the small groups of particles into flocs. Thus, the term "agglomerant" is generally avoided in this description if only to avoid some confusion, although the act of agglomeration during the recited method occurs when particles group into small groups.

In another exemplary embodiment, the present invention comprises a method of forming a cake with solids content from particles in a fluid comprising subjecting at least a portion of the particles in the fluid with an additive, and dewatering at least a portion of the flocs to form a cake with a solids content, wherein the additive comprises one or more proteins.

In another exemplary embodiment, the present invention comprises a method of treating a suspension of particles in a fluid including the steps of (i) promoting flocculation of the particles and (ii) dewatering the flocs to form a cake with a solids content, the present invention comprises step (iii), exposing the suspension to one or more proteins, which increases the solids content of the cake after step (ii) of dewatering over that which is provided without step (iii). The present invention further increases the solids content of the cake after step (ii) of dewatering over that which is provided if the suspension is exposed to the conventional treatment of polymers or lime as a chemical treatment for the suspension.

In an exemplary embodiment, at least one of the one or more proteins is derived from soy protein and/or derivatives thereof. The protein can be derived from whey protein and/or derivatives thereof. The protein can be derivatized to cationize the protein structure.

The protein preferably is not separated from the reaction mixture used to extract the protein from, for example, soy flour.

The suspension of particles can be in water.

The suspension can be a suspension of biological sludge derived from a wastewater treatment system. The suspension can be a suspension of non-biological sludge. The suspension can contain a mixture of biological and non-biological sludge particles. The suspension can be a suspension of pulp fiber.

The concentration of the total amount of protein present in the suspension can be between approximately 0.01 and 30 lbs/ton of the particles expressed on a dry solids basis. The concentration of the total amount of protein present in the suspension can be between approximately 0.01 and 10,000 mg/liter of the fluid.

The cake with a solids content can be exposed to both one or proteins in combination with a flocculant. The flocculant can be a cationic polymer. The flocculant can be a cationic polyacrylamide. The flocculant can be present at a concentration ranging from 1%-90% of the concentration of the total amount of protein present in the suspension.

The present invention provides advantages over the conventional systems by providing a method that increases the cake solids by treating a slurry of fiber or sludge with proteins or derivatives thereof. The conventional method of treating a slurry of fiber or sludge includes the step of promoting flocculation of the particles, which typically comprises treating the slurry with chemicals that promote the agglomeration of the particles into flocs that can be more easily dewatered. For sludge, this known method also includes the step of dewatering the sludge at a dewatering rate to form a cake with a solids content, which typically comprises subjecting the flocculated sludge to a belt press, screw press or centrifuge, wherein the chemically-treated sludge is dewatered therein. The present invention is novel and non-obvious over the conventional systems by treating sludge with an exposure of proteins to increase the solids content of the final cake. This benefit provides, among other things, substantial cost savings by reducing the mass and volume of the sludge that needs to be disposed of.

The consolidation of solids in a slurry is not limited to sludge but applies to many applications where particulate matter can be consolidated by the action of proteins. In a preferred embodiment, the solids content of the cake formed from dewatering pulp fibers in a slurry is increased when the slurry is exposed to a soy protein.

These and other objects, features and advantages of the present invention will become more apparent upon reading the following specification in conjunction with the accompanying drawing figure.

DETAILED DESCRIPTION OF THE INVENTION

Figure 1:
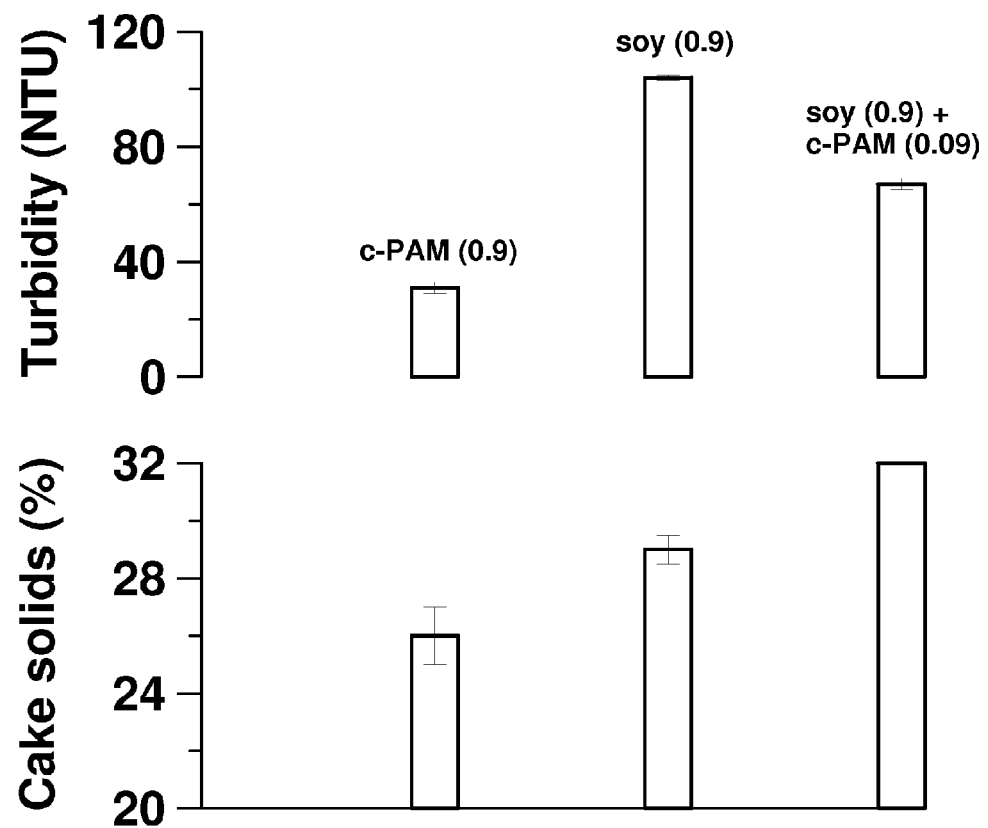
FIG. 1 is an illustration of the results of dewatering bleached hardwood fiber conditioned with isolated soy protein according to an exemplary embodiment of the present invention. The unit for the values in parenthesis is g/kg fiber. The results were averaged from two measurements.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" or "nearly free" of something, or "substantially pure", and like char carbon characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The present invention comprises dewatering wet particulate matter with biological molecules comprising one or more chains of amino acids. The biological molecules include proteins and derivatives thereof. In exemplary embodiments, the biological molecules comprise soy and soy derivatives.

In a method of treating a suspension of particles in a fluid including the steps of (i) promoting flocculation of the particles and (ii) dewatering the flocs to form a cake with a solids content, the present invention includes an improvement comprising the step (iii) of exposing the suspension to chemicals of the protein family. The suspension of one embodiment of the present method can include a suspension of biological sludge in water. In another embodiment, the suspension is a suspension of non biological material.

The following examples, which are merely illustrative of the present invention, further demonstrate application of the present invention, as well as demonstrate the benefits associated therewith.

Example 1

Defatted soy flour was obtained from Archer Daniels Midland Co. Pro-Cote 4200 (a soy protein isolate) was provided by Solae. The c-PAM was provided by Eka Chemicals and had a molecular weight of 6.7 MDa and a nominal charge substitution of 40%. Bleached hardwood fiber was provided by the Alabama River Pulp Co.

A fiber suspension prepared at 2% solids was dewatered in a Crown press, which is known to simulate the performance of a belt filter press. Cake solids and turbidity results from dewatering hardwood fiber with Pro-Cote 4200 soy protein are presented in FIG. 1.

Higher cake solids are obtained with soy protein than with an equivalent concentration of the c-PAM. The turbidity is also higher with the soy protein. However, as seen in FIG. 1, the turbidity can be lowered with a small supplemental c-PAM dose. The supplemental c-PAM dose further increases cake solids to a level higher than that obtained with either c-PAM alone or soy protein alone.

It is thus clear in this example that the combination of soy protein and c-PAM provides higher solids than use of the c-PAM alone. Additionally, the much lower cost of the soy protein as compared to the cost of the c-PAM provides an economic advantage over the practice of using the c-PAM alone.

Example 2

Isolation of the soy protein from soy flour requires extraction and drying of the protein, which adds to cost. These costs could be minimized, if not eliminated, if the crude protein extract was added directly to the fiber slurry.

Crude soy protein was prepared by stirring a 20% suspension of defatted soy flour in pH 10 water for 2 hours at 55° C. The suspension formed a paste that was added directly without further purification to the slurry to be dewatered. The suspension was then dewatered in a Crown press.

The results, provided in TABLE 1, demonstrate that the crude soy protein extract leads to an increase in cake solids. The soy and the c-PAM provide the same cake solids when applied at the same dosage of 0.45 g/kg fiber, but it is advantageous to use the soy because it is lower in cost than the c-PAM.

TABLE 1

Dewatering bleached hardwood pulp suspension with crude soy protein (2% solids in water).

| Suspension | Cake Solids (%) n = 2 |
|---|---|
| fiber only | 27.9 ± 0.8 |
| fiber + 0.45 g c-PAM/kg fiber | 30.9 ± 0.2 |
| fiber + 0.45 g soy protein/kg fiber | 31 ± 1 |
| fiber + 0.9 g soy protein/kg fiber | 32.7 ± 0.2 |
| fiber + 2.7 g soy protein/kg fiber | 32.8 ± 0.5 |

Example 3

Sludge was obtained from several paper mills, which properties are listed in TABLE 2. Results from dewatering three paper mill sludges with crude soy protein (prepared as described in Example 2) are compiled in TABLE 3.

For mill B sludge the soy/c-PAM combination provides the same cake solids as the c-PAM alone, but at a much lower c-PAM dose. The crude soy additive greatly increases cake solids for Mill P. The results for Mill W sludge are similar to those obtained for Mill B in that the soy protein reduces the c-PAM dose.

It is evident that the results obtained in Examples 1 and 2 with fiber also apply to a variety of paper mill sludges.

TABLE 2

Properties of paper mill sludge.

| Sludge | Source |
|---|---|
| C | recycled bleached kraft pulp |
| B | bleached kraft pulp (mixture of fiber and biological sludge) |
| P | bleached kraft pulp |
| W | bleached kraft pulp (mixture of fiber and biological sludge) |

TABLE 3

Dewatering sludge with crude soy protein.

| Additive | Cake Solids (%) | TSS[1] (mg/l) |
|---|---|---|
| Mill B | | |
| None | 26 ± 1 | 5,300 ± 300 |
| 0.55 g c-PAM/kg sludge | 34.7 ± 0 | 3,400 ± 800 |
| 0.14 g c-PAM/kg sludge + 1.4 g soy protein/kg sludge | 35.0 ± 0.3 | 5,800 ± 600 |
| Mill P | | |
| none | 28.7 ± 0.2 | |
| 0.45 g soy protein/kg sludge | 32.1 ± 0.1 | |
| 0.90 g soy protein/kg sludge | 32.9 ± 0.1 | |
| 1.4 g soy protein/kg sludge | 35.0 ± 0.6 | |
| Mill W | | |
| 3.6 g c-PAM/kg sludge | 24.0 | 347 |
| 2.3 g c-PAM/kg sludge + 1.4 g soy protein/kg sludge | 23.6 | 472 |

[1]TSS: Total Suspended Solids

Example 4

It can be advantageous in some circumstances to use a cationic species as a dewatering aid. The soy protein (Pro-Cote) used in Example 1 was cationized by Quat 188 (a solution of 3-chloro-2-hydroxypropyltrimethylammonium chloride), obtained from Dow Chemical through a cationization procedure known in the art. The Pro-Cote (50 g) was mixed with 150 ml deionized water and 106 g Quat 188 solution at 700 rpm at 60° C. for 30 hours. The pH was maintained at 8.5-10 with NaOH. The final mixture contained 41.2% solids.

Figure 2:
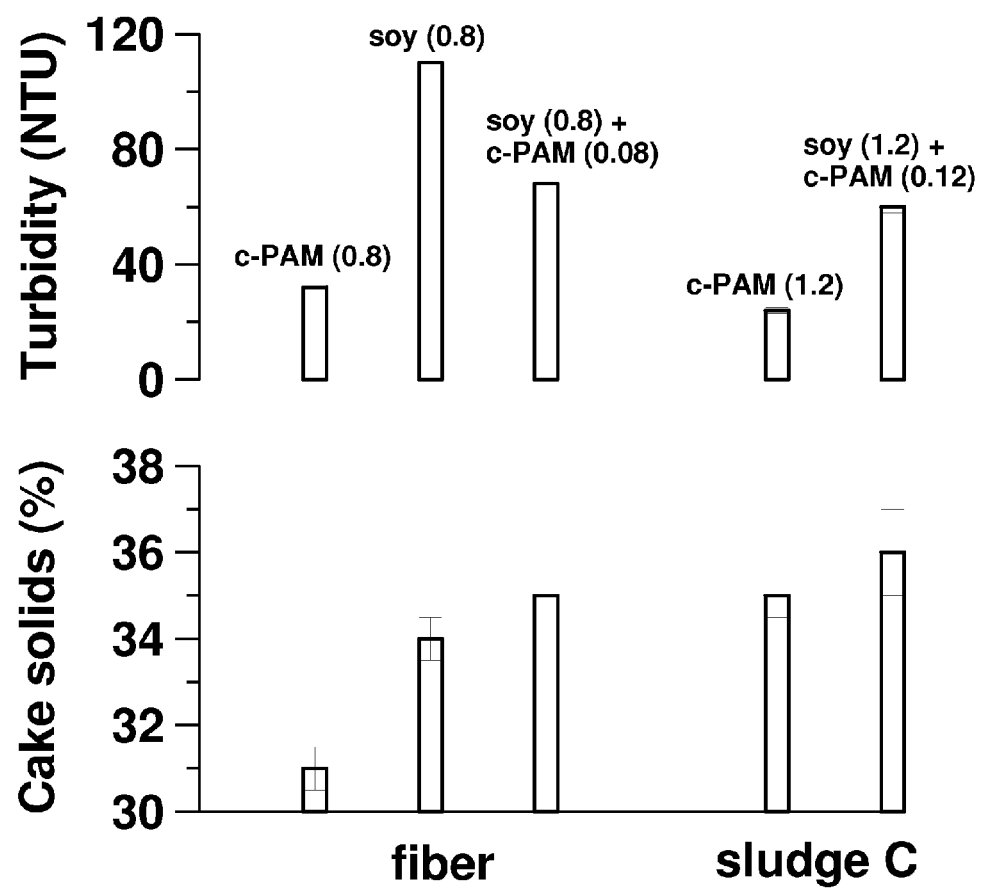
FIG. 2 is an illustration of the results of dewatering hardwood fiber and paper sludge conditioned with cationized soy protein according to an exemplary embodiment of the present invention. The unit for the values in parenthesis is g/kg dry solids. The results were averaged from two measurements.

Cationization increased the zeta potential (measured at pH 7) of the Procote from −24.5 mV to 14.5 mV. The cationized protein was used as is, i.e. it was not isolated from solution. The cationized protein was used to dewater both fiber and sludge C (described in TABLE 2). The results are shown in FIG. 2.

Cake solids for the fiber were higher with the soy than with the c-PAM at an equivalent dose. Following the trend shown in FIG. 1, addition of a small c-PAM supplement reduced the turbidity although not to the levels achieved by the c-PAM alone. Similar results were obtained for sludge.

Example 5

Figure 3:
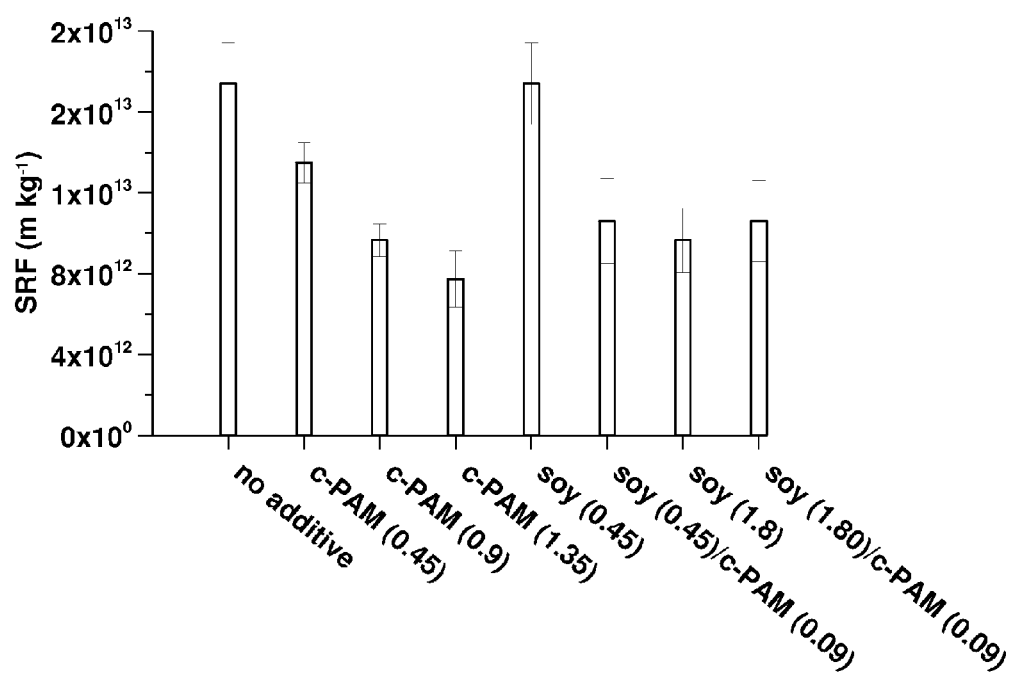
FIG. 3 is an illustration of the SRF values for fiber treated with combinations of c-PAM and quaternized Pro-Cote. The unit for the values in parentheses in the abscissa in g/kg fiber.

A standard procedure for determining dewatering efficiency is through Specific Resistance to Filtration (SRF) measurements that factor out the effects of pressure and other variables on dewaterability. SRF measurements were made with bleached hardwood and combinations of quaternized Pro-Cote used in Example 1 and c-PAM. The results in FIG. 3 show the expected decrease in SRF with increasing dose of c-PAM.

The SRF value obtained from adding only the soy protein at 0.45 g/kg is the same as the base case with no additive. The SRF decreases at the higher soy value of 1.8 g/kg. The combination of 0.45 g/kg soy protein and 0.09 g/kg c-PAM provides an SRF roughly equal to that obtained from a 0.9 g/kg c-PAM dose. These measurements track those made for cake solids in FIG. 1 in that most of the c-PAM can be substituted with soy protein at substantial cost savings.

Example 6

Figure 4:
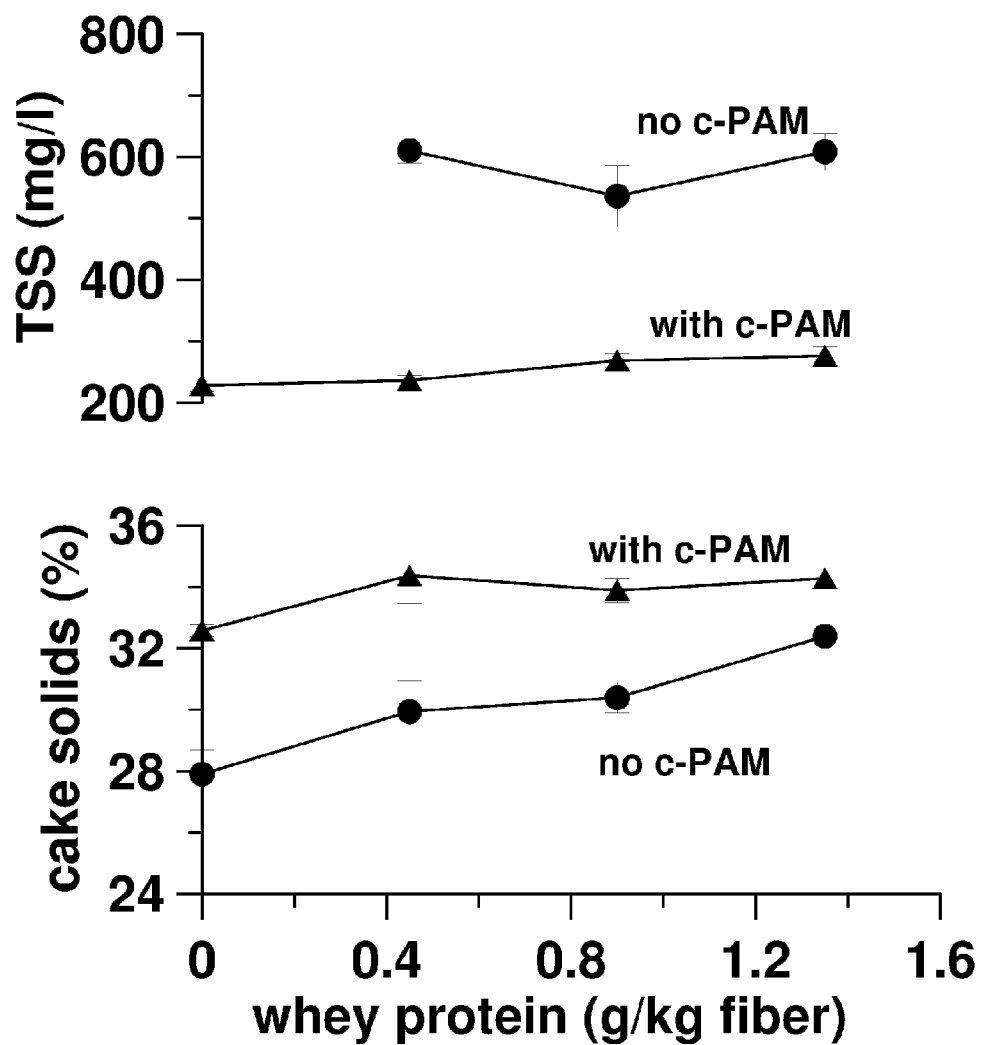
FIG. 4 is an illustration of the effect of whey protein on cake solids and filtrate TSS. The c-PAM was applied at 0.45 g/kg.

In order to demonstrate that the results obtained with soy protein are also achievable with other proteins, measurements were made with whey protein and 2% hardwood fiber. The results, presented in FIG. 4, are comparable to those obtained with soy protein illustrated in the preceding examples. Most proteins are able to bind to cellulosic fiber, and in principle, all such proteins should be able to enhance dewatering.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. In a method of treating a suspension of particles in a fluid including the steps of (i) promoting flocculation of at least a portion of the suspension of particles with an additive and (ii) dewatering at least a portion of the suspension of particles to form a cake with a solids content, the improvement comprising promoting flocculation of at least a portion of the suspension of particles with an additive comprising protein;
   wherein the protein structure is not separated from the reaction mixture used to extract the protein from soy flour; and
   wherein the concentration of the total amount of protein present in the additive is between approximately 0.01 and 30 lbs/ton of particles, expressed on a dry solids basis.

2. The method of claim 1, wherein the concentration of the total amount of protein present in the additive is between approximately 0.01 and 10,000 mg/liter of the fluid.

3. The method of claim 1, wherein the additive further comprises a flocculant.

4. The method of claim 3, wherein the flocculant is a cationic polymer.

5. The method of claim 3, wherein the flocculant is a cationic polyacrylamide.

6. The method of claim 3, where the flocculant is present at a concentration ranging from approximately 1%-90% of the concentration of the total amount of protein present.

7. A method of forming a cake with solids content from particles in a fluid comprising:
   subjecting at least a portion of the particles in the fluid with an additive; and
   dewatering at least a portion of the solids content from particles to form a cake with a solids content;
   wherein the additive comprises one or more proteins;
   wherein the protein structure is not separated from the reaction mixture used to extract the protein from soy flour; and
   wherein the concentration of the total amount of protein present in the additive is between approximately 0.01 and 10,000 mg/liter of fluid.

8. The method of claim 7, wherein the concentration of the total amount of protein present in the additive is between approximately 0.01 and 30 lbs/ton of particles, expressed on a dry solids basis.

9. The method of claim 7, wherein the additive further comprises a flocculant; and
   wherein the flocculant is a cationic polymer.

10. The method of claim 7, wherein the additive further comprises a flocculant; and
    wherein the flocculant is a cationic polyacrylamide.

11. The method of claim 7, wherein the additive further comprises a flocculant; and
    where the flocculant is present at a concentration ranging from approximately 1%-90% of the concentration of the total amount of protein present.

12. In a method of treating a suspension of particles in a fluid including the steps of (i) promoting flocculation of the particles and (ii) dewatering the flocs to form a cake with a solids content, the improvement comprising the step (iii) of exposing the suspension to one or more proteins, which step (iii) increases the solids content of the cake after the step (ii) of dewatering over that which is provided without step (iii);
    wherein the protein structure is not separated from the reaction mixture used to extract the protein from soy flour; and
    wherein the suspension is a suspension selected from the group consisting of biological sludge, non-biological sludge, pulp fiber, and a combination of one or more biological sludge, non-biological sludge and pulp fiber.

13. The method of claim 12, wherein the protein structure is derived from soy protein and derivatives thereof;
    wherein the fluid is water.

14. The method of claim 13, wherein the concentration of the total amount of protein present in the suspension is between approximately 0.01 and 30 lbs/ton of the particles expressed on a dry solids basis.

15. The method of claim 13, wherein the concentration of the total amount of protein present in the suspension is between approximately 0.01 and 10,000 mg/liter of the fluid.

16. The method of claim 13 further comprising exposing the suspension to a flocculant, wherein the flocculant is present at a concentration ranging from 1%-90% of the concentration of the total amount of protein present in the suspension.

* * * * *